(12) United States Patent
Salkintzis

(10) Patent No.: US 9,210,536 B2
(45) Date of Patent: Dec. 8, 2015

(54) METHOD FOR ESTABLISHING DEVICE-TO-DEVICE COMMUNICATION

(71) Applicant: MOTOROLA MOBILITY LLC, Libertyville, IL (US)

(72) Inventor: Apostolis Salkintzis, Athens (GR)

(73) Assignee: Google Technology Holdings LLC, Mountain View, CA (US)

( * ) Notice: Subject to any disclaimer, the term of this patent is extended or adjusted under 35 U.S.C. 154(b) by 124 days.

(21) Appl. No.: 14/055,901

(22) Filed: Oct. 17, 2013

(65) Prior Publication Data

US 2014/0348061 A1    Nov. 27, 2014

Related U.S. Application Data

(60) Provisional application No. 61/825,595, filed on May 21, 2013.

(51) Int. Cl.
*H04W 4/00* (2009.01)
*H04W 48/08* (2009.01)
(Continued)

(52) U.S. Cl.
CPC ........... *H04W 4/008* (2013.01); *H04L 65/1006* (2013.01); *H04L 65/1016* (2013.01); *H04L 65/1063* (2013.01); *H04L 65/4038* (2013.01); *H04L 67/104* (2013.01); *H04L 67/1093* (2013.01); *H04W 48/08* (2013.01); *H04W 84/18* (2013.01)

(58) Field of Classification Search
CPC ...... H04W 4/008; H04W 84/18; H04W 48/08
USPC .......................................................... 370/328
See application file for complete search history.

(56) References Cited

U.S. PATENT DOCUMENTS 6,226,524 B1    5/2001 Allen et al.
2007/0237139 A1    10/2007 Garcia-Martin et al.
(Continued)

FOREIGN PATENT DOCUMENTS

EP    2086206 A1    8/2009

OTHER PUBLICATIONS

International Search Report for Application No. PCT/US2014/038363 dated Aug. 28, 2014.
(Continued)

*Primary Examiner* — Sai-Ming Chan
(74) *Attorney, Agent, or Firm* — Lerner, David, Littenberg, Krumholz & Mentlik, LLP

(57) ABSTRACT

A method and system establishes a peer-to-peer (P2P) communication session between user equipments (UEs) under control of a network. A proximity services (ProSe) server associated with a first controlling network receives from a first UE a communication request message indicating that at least one other UE is in close proximity with the first UE. Based on the close proximity between the UEs, the server establishes a P2P group which includes the first UE and at least one other UE. In addition, the server identifies respective P2P Internet Protocol (IP) addresses for the UEs within the established P2P group. The server then instructs the UEs to communicate within the established P2P group using respective P2P IP addresses. Following receipt of a response indicating acceptance by a second UE of an instruction to communicate within the established P2P group using a corresponding P2P IP address, the server establishes the communication session.

14 Claims, 10 Drawing Sheets

(51) Int. Cl.
*H04W 84/18* (2009.01)
*H04L 29/06* (2006.01)
*H04L 29/08* (2006.01)

(56) References Cited

U.S. PATENT DOCUMENTS

| | | |
|---|---|---|
| 2008/0109446 A1 | 5/2008 | Wang |
| 2011/0294474 A1 | 12/2011 | Barany et al. |
| 2012/0044815 A1* | 2/2012 | Geirhofer et al. ............ 370/248 |
| 2012/0179789 A1 | 7/2012 | Griot et al. |
| 2012/0213173 A1 | 8/2012 | Malladi et al. |
| 2012/0243437 A1 | 9/2012 | Horn et al. |
| 2014/0092885 A1* | 4/2014 | Venkatachalam et al. .... 370/338 |

OTHER PUBLICATIONS

Doppler, Klaus, et al.: "Device-to-Device Communication as an Underlay to LTE-Advanced Networks", IEEE Communications Magazine, Dec. 2009, 0163-6804/09/$25.00, pp. 42-49.

Lei, Lei et al.: "Operator Controlled Device-to-Device Communications in LTE-Advanced Networks", IEE Wireless Communications, Jun. 2012, 1536-1284/12/$25.00, pp. 96-104.

Fodor, Gabor et al.: Design Aspects of Network Assisted Device-to-Device Communications, IEEE Communications Magazine, Mar. 2012, 0163-6804/12/$25.00, pp. 170-177.

* cited by examiner

METHOD FOR ESTABLISHING DEVICE-TO-DEVICE COMMUNICATION

BACKGROUND

1. Technical Field

The present disclosure relates in general to wireless communication devices and in particular to direct communication between wireless communication devices.

2. Description of the Related Art

Conventional methods for establishing peer-to-peer (P2P) communication between two wireless communication devices or user equipment (UE) are autonomously executed by the devices. P2P communication can be provided using Bluetooth and WiFi Direct as well as other close range communication technologies. In the WiFi Direct case, for example, devices execute discovery procedures to discover other devices in close proximity and, when other devices are discovered, the devices execute procedures for forming a P2P group. In addition, at least one device assigns IP addresses to each device in the P2P group. All these procedures are autonomously executed by the P2P devices without the network being able to control these procedures and/or control the establishment of P2P groups in any way. As a result, the network is unable to control or manage the establishment of P2P groups and/or charge a subscriber for providing or facilitating direct communication services.

BRIEF DESCRIPTION OF THE DRAWINGS

The described embodiments are to be read in conjunction with the accompanying drawings, wherein.

DETAILED DESCRIPTION

Figure 1:
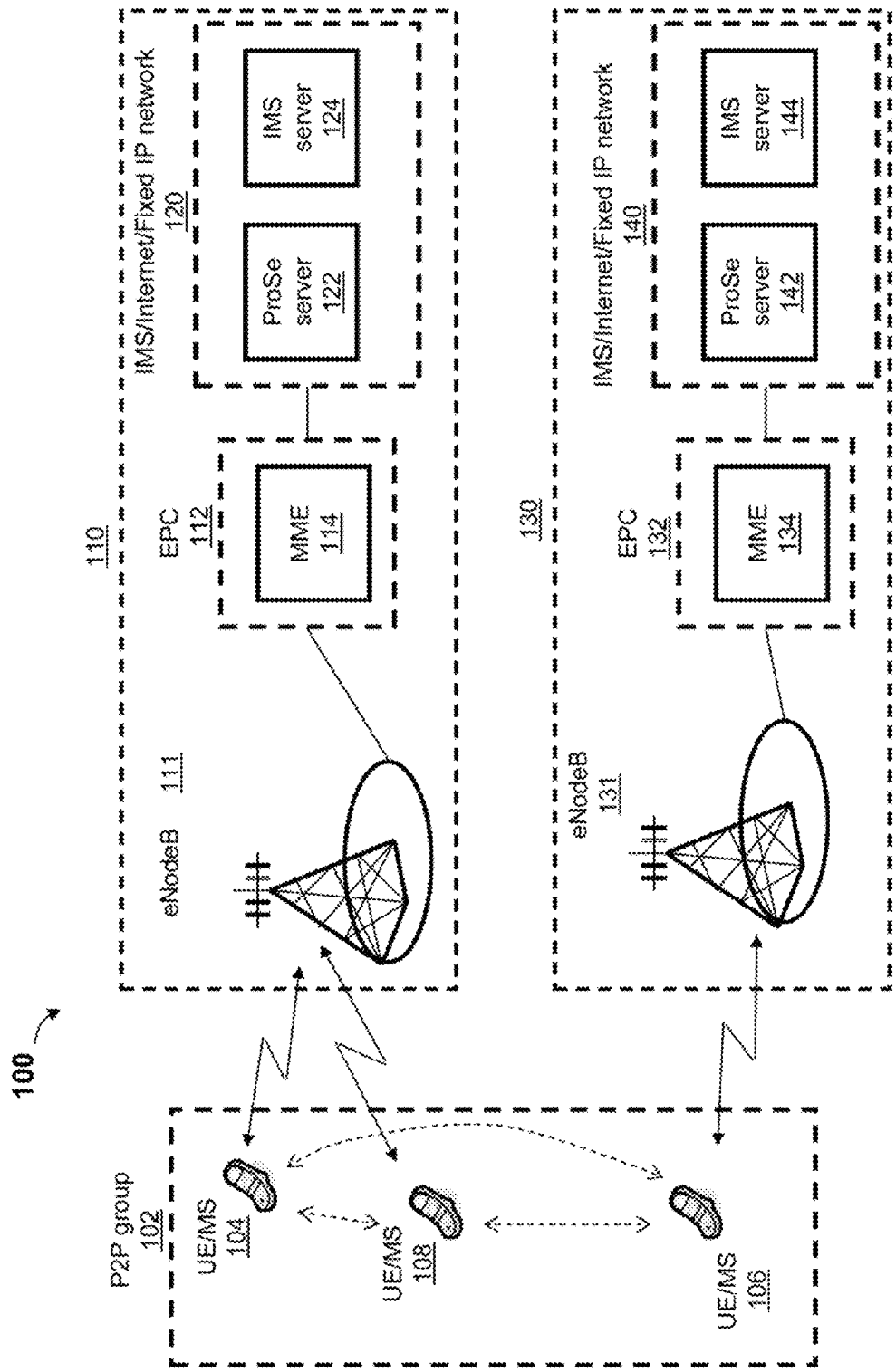
FIG. 1 is a system diagram illustrating an environment in which a first wireless communication device can be configured to operate as an access point for an established peer-to-peer (P2P) group via a proximity services server, according to one or more aspects of the disclosure.

The illustrative embodiments provide a method and system for establishing a peer-to-peer (P2P) communication session between user equipments (UEs) under control of a network. A proximity services (ProSe) server associated with a first controlling network receives from a first UE that is communicatively coupled to the first controlling network a communication request message indicating that at least one other UE is in close proximity with the first UE. Based on the close proximity between the UEs, the server establishes a P2P group which includes the first UE and at least one other UE. In addition, the server identifies respective P2P Internet Protocol (IP) addresses for the UEs within the established P2P group. The server then instructs the UEs to communicate within the established P2P group using respective P2P IP addresses. Following receipt of a response indicating acceptance by a second UE of an instruction to communicate within the established P2P group using a corresponding P2P IP address, the server establishes the communication session.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

FIG. 1 is a system diagram illustrating the overall environment in which a first wireless communication device or first user equipment (UE) can be configured to operate as an access point for an established peer-to-peer (P2P) group via a proximity services server, according to one or more aspects of the disclosure. Environment 100 comprises first user equipment (UE) 104 and second UE 106. Environment 100 also comprises first controlling network 110 on which both first UE 104 and third UE 108 are subscribers that are both wirelessly connected to eNodeB 111. Also included within environment 100 is second controlling network 130 on which second UE 106 is a subscriber that is wirelessly connected to eNodeB 131.

First controlling network 110 comprises evolved Node B (eNodeB) 111 and Evolved Packet Core (EPC) 112. EPC 112 includes Mobility Management Entity (MME) 114, which is the key control node for a Long Term Evolution (LTE) access-network. Also included within first controlling network 110 are an Internet Protocol Multimedia Subsystem (IMS) network, the Internet, and a fixed IP network collectively illustrated as IMS/Internet/Fixed IP network 120. As illustrated, IMS/Internet/Fixed IP network 120 comprises first proximity services (ProSe) server 122 and first IMS server 124. First ProSe server 122 is also referred to as first server 122 herein.

Similarly configured to first controlling network 110, second controlling network 130 comprises enodeB 131 and Evolved Packet Core (EPC) 132, which includes Mobility Management Entity (MME) 134. Also included within second controlling network 130 are IMS/Internet/Fixed IP network 140, which includes second proximity services (ProSe) server 142 and second IMS server 144.

In order to establish a peer-to-peer (P2P) group (e.g., P2P group 102 which can be considered to be a direct communication network) and a corresponding P2P communication session for wireless communication devices under control of a network, first (ProSe) server 122 associated with first controlling network 110 transmits a request for establishing the P2P group to first UE 104, which is communicatively coupled to first controlling network 110. In one embodiment, the procedure for establishing the P2P group is initiated or triggered when first UE 104 discovers second UE 106. In particular, first UE 104 can discover second UE 106 using one of a number of close range communication technologies, including but not limited to (a) WiFi Direct (b) LTE Direct and (c) Bluetooth. Following discovery of second UE 106, first UE 104 sends a communication request to first controlling network 110 and specifically to first server 122 requesting establishment of a session with second UE 106. For example, in one implementation, first UE 104 sends a Session Initiation Protocol (SIP) Invite request (message) to first server 122 to trigger first server 122 to establish P2P group 102. The receipt of an SIP Invite request from first UE 104 informs first server 122 that the target device (second UE 106) is located within close proximity to the requesting device (first UE 104).

Based on the close proximity of first UE 104 to second UE 106, first server 122 makes a determination to establish the session being requested directly between first UE 104 and second UE 106. In other words, first server 122 decides to establish a direct user device-to-user device communication channel or direct (P2P) communication network to enable a direct communication session between first UE 104 and second UE 106. By establishing the direct user-plane, first server 122 reduces network traffic and potentially improves the user experience by offering reduced round-trip delay. This reduction in round trip delay is particularly useful in a number of applications including, for example, gaming applications.

First server 122 initiates a P2P group formation procedure during which first server 122 provides configuration data to both first UE 104 and second UE 106 to enable the two UEs to form a P2P group using P2P procedures, as described herein. After forming the P2P group, a specific close range communication technology is identified and/or selected for the P2P group communication. Thus, for example, first server 122 can select WiFi as the close range communication technology for the P2P group communication once it is determined or confirmed that the two UEs support WiFi. First server 122 also assigns specific IP addresses to respective WiFi interfaces of the two user devices. As a result, first UE 104 and second UE 106 will be able to participate in a direct communication session using the assigned IP addresses. Within the descriptions which follow, these assigned IP addresses are also referred to as the assigned P2P IP addresses.

With the P2P group setup completed, first server 122 responds to the communication request sent by first UE 104 by inviting the two UEs (i.e., first UE 104 and second UE 106) to establish the requested communication session over the established P2P group. The two UEs can then initiate direct communication with each other within an established P2P group 102 in which first UE 104 is a group owner operating as an access point (AP) for the P2P group and second UE 106 operates as a P2P client. By operating as an AP, first UE 104 transmits Beacons with the P2P IP and accepts associations from other P2P devices or legacy WiFi devices (i.e., UEs that do not implement P2P functionality).

Figure 2:
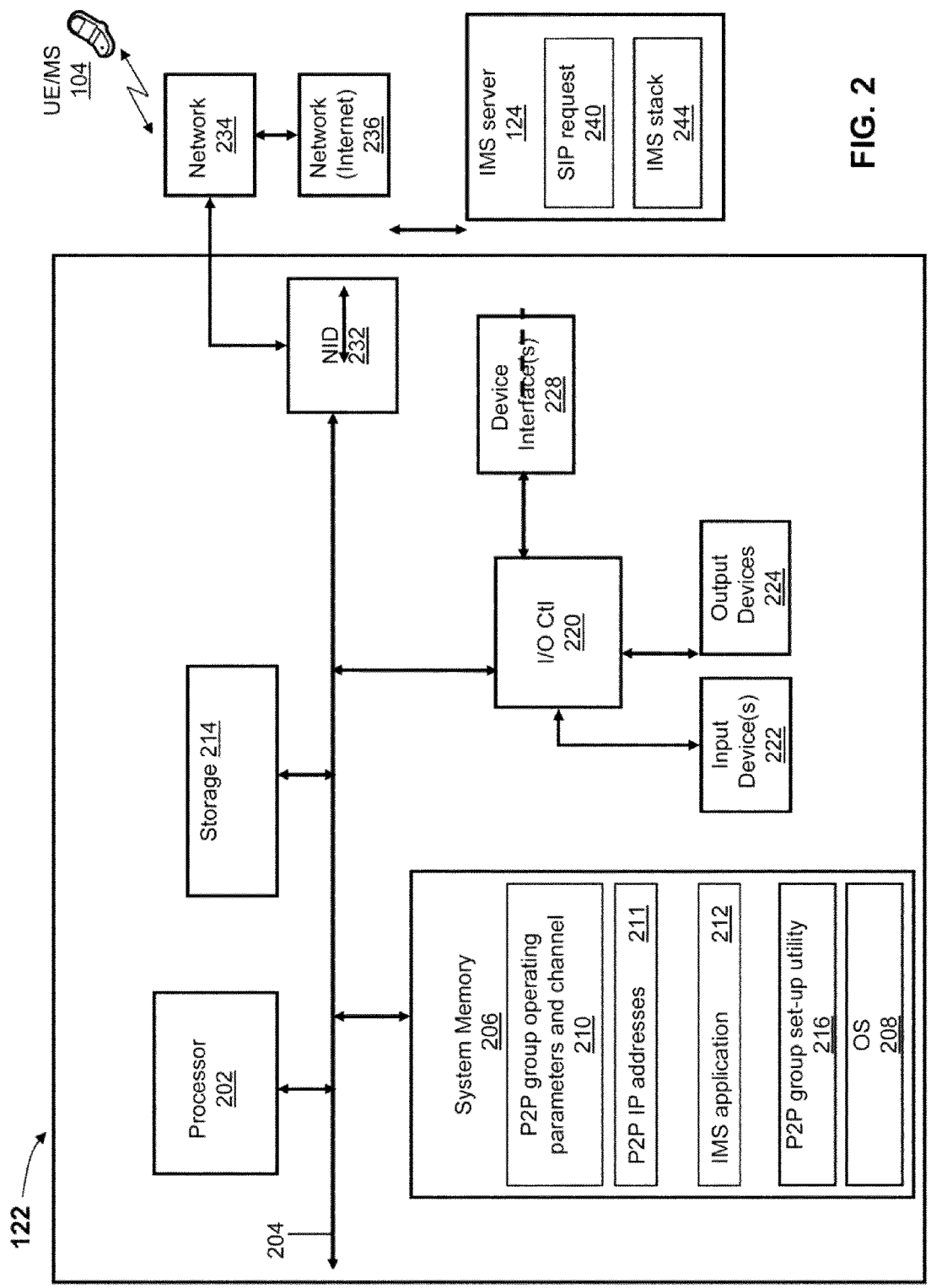
FIG. 2 provides a block diagram representation of a proximity services server, within which the various features of the described embodiments can be advantageously implemented, according to one embodiment.

With specific reference now to FIG. 2, there is depicted a block diagram representation of an example proximity services (ProSe) server, within which the various features of the described embodiments can be advantageously implemented, according to one embodiment. First (ProSe) server 122 includes one or more processor(s) 202 coupled to system memory 206 via system interconnect 204. As shown, system memory 206 can include therein a plurality of processor-executable modules, including operating system (O/S) 208, IMS application 212, and P2P group set-up utility 216. In addition, system memory 206 includes peer-to-peer (P2P) group operating parameters 210, and P2P IP addresses 211. The various software and/or firmware modules have varying functionality when their corresponding program code is executed by processor(s) 202 or other processing devices within first ProSe server 122.

In one embodiment, P2P operating parameters and channel 210 comprise (i) a preferred close range wireless communication technology (e.g., WiFi Direct or LTE Direct) that can be used for setting up a P2P group, (ii) a Service Set Identifier (SSID) to publicly identify the P2P network group, (iii) a secret key to be used by first UE 104 and second UE 106 to secure direct communication between first UE 104 and second UE 106, (iv) a preferred operating wireless channel for the P2P group and (v) P2P IP addresses assigned to first UE 104 and second UE 106, respectively, and to other UEs within P2P group.

As illustrated, first ProSe server 122 can further include one or more input/output (I/O) controllers 220 which support connection to and processing of signals from one or more connected input device(s) 222, such as a keyboard, mouse, touch screen, or microphone. I/O controllers 220 also support connection to and forwarding of output signals to one or more connected output device(s) 224, such as a monitor or display device or audio speaker(s). In addition, server 122 includes one or more device interface(s) 228, which can provide an integration point for connecting other device(s) to server 122. In one implementation, server 122 connects to IMS server 124 using device interface(s) 228.

First ProSe server 122 comprises a network interface device (NID) 232. NID 232 enables server 122 to communicate and/or interface with other devices, services, and components that are located external to server 122. These devices, services, and components can interface with server 122 via an external network, such as network 236, using one or more communication protocols. In particular, in one implementation, server 122 uses NID 232 to connect to IMS server 124 via an external network, such as network 236. As illustrated, IMS server 124 comprises SIP request 240 and IMS stack 244.

The connection to and/or between network 236 and server 122 can be wired or wireless or a combination thereof. For purposes of discussion, network 236 is indicated as a single collective component for simplicity. However, it is appreciated that network 236 can comprise one or more direct connections and/or indirect or wireless connections to other devices as well as a more complex set of interconnections as can exist within a wide area network, such as the Internet.

Also illustrated in FIG. 2 is UE communication network 234 by which first ProSe server 122 is communicatively connected to at least one UE or wireless communication device, including first UE 104. UE communication network 234 can comprise a wireless network and one or more wired networks including direct connections to other devices within first controlling network 110 (FIG. 1).

The various components within first ProSe server 122 can be electrically and/or communicatively coupled together as illustrated in FIG. 2. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 2, it is to be understood that more, fewer or different interconnections may be present in other embodiments.

Figure 3:
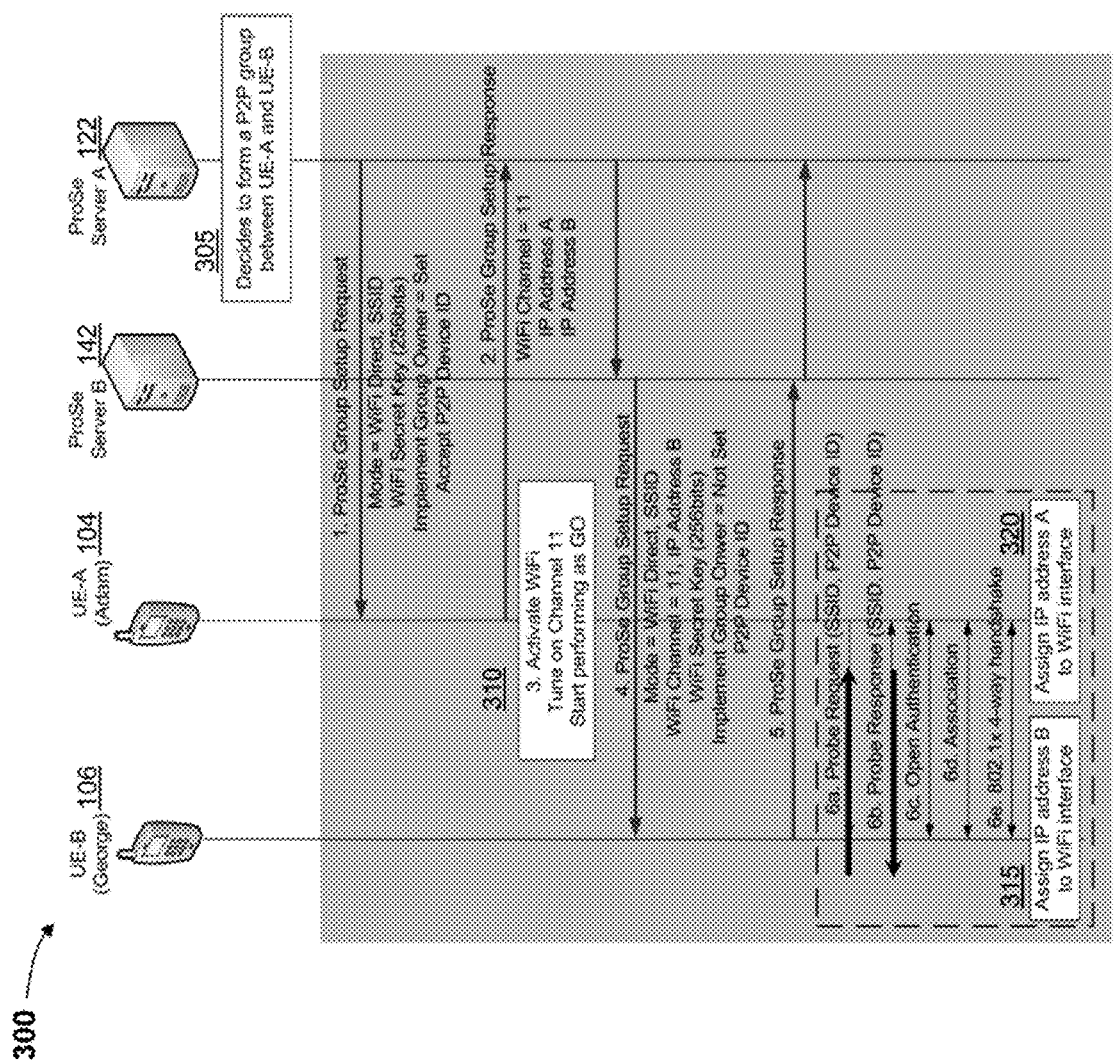
FIG. 3 illustrates a first messaging sequence used to establish a P2P group and enable a P2P communication session, according to one embodiment.
Figure 4:
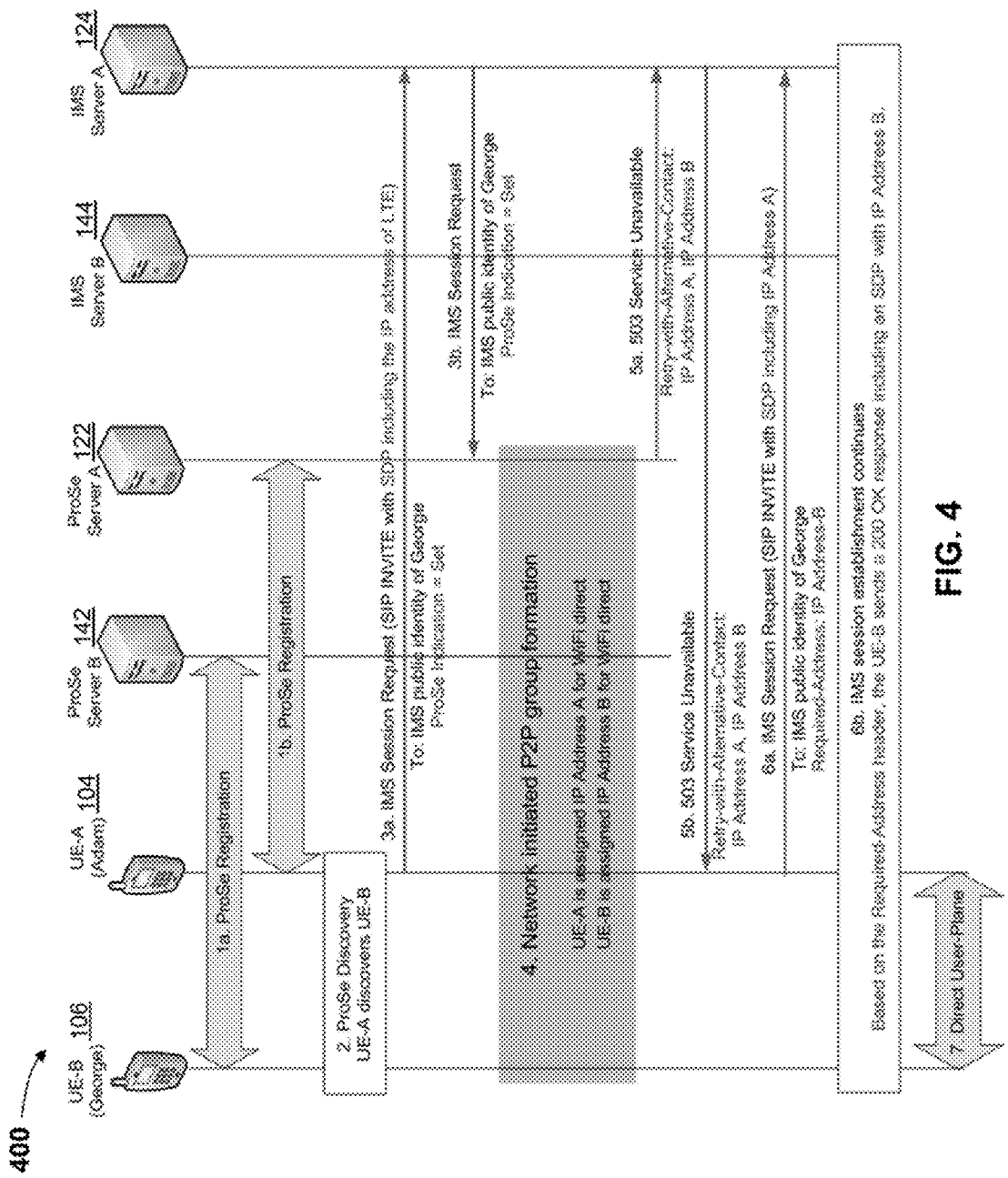
FIG. 4 illustrates a second messaging sequence used to establish a P2P group and enable a P2P communication session, according to one embodiment.
Figure 5:
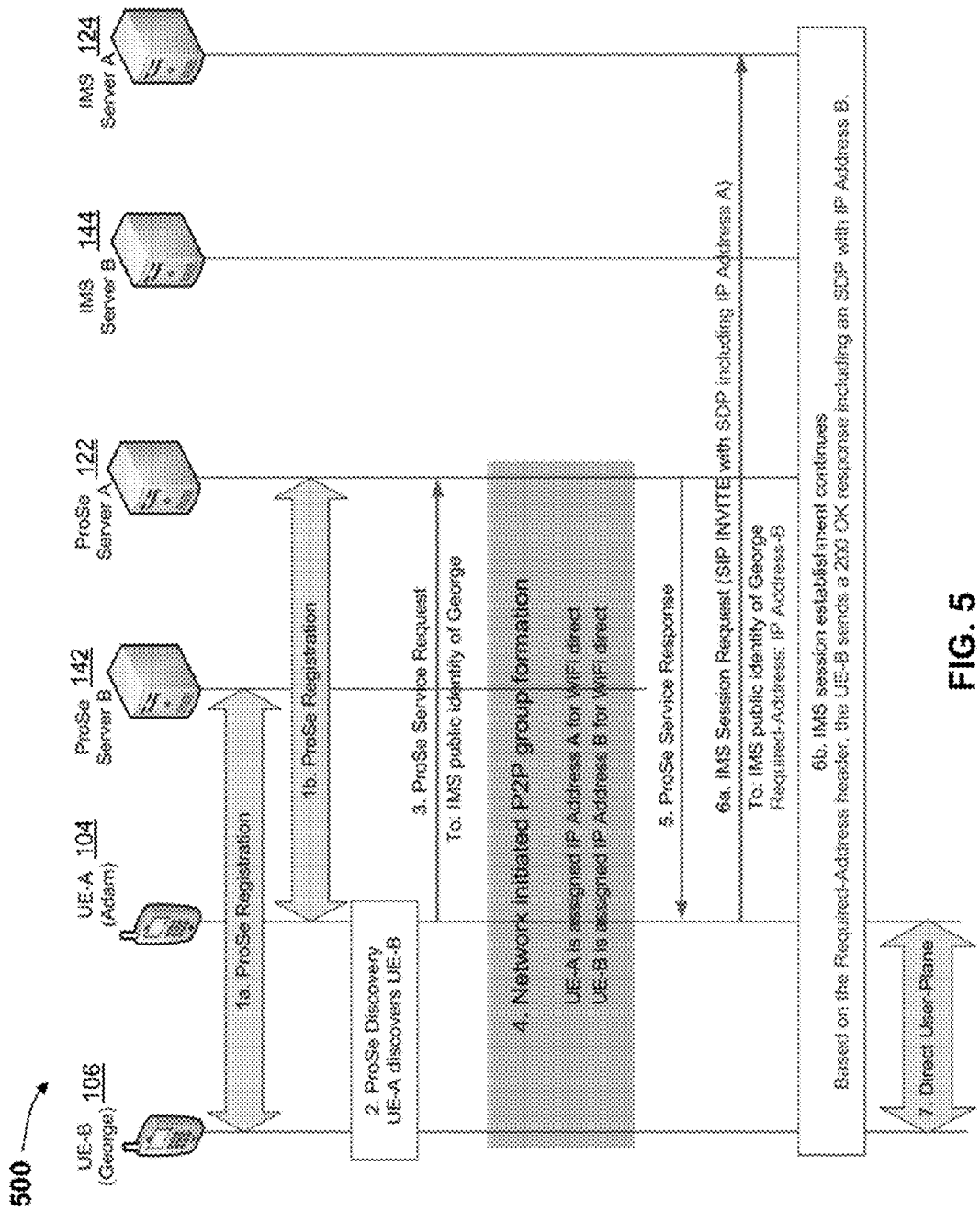
FIG. 5 illustrates a third messaging sequence used to establish a P2P group and enable a P2P communication session, according to one embodiment.
Figure 6:
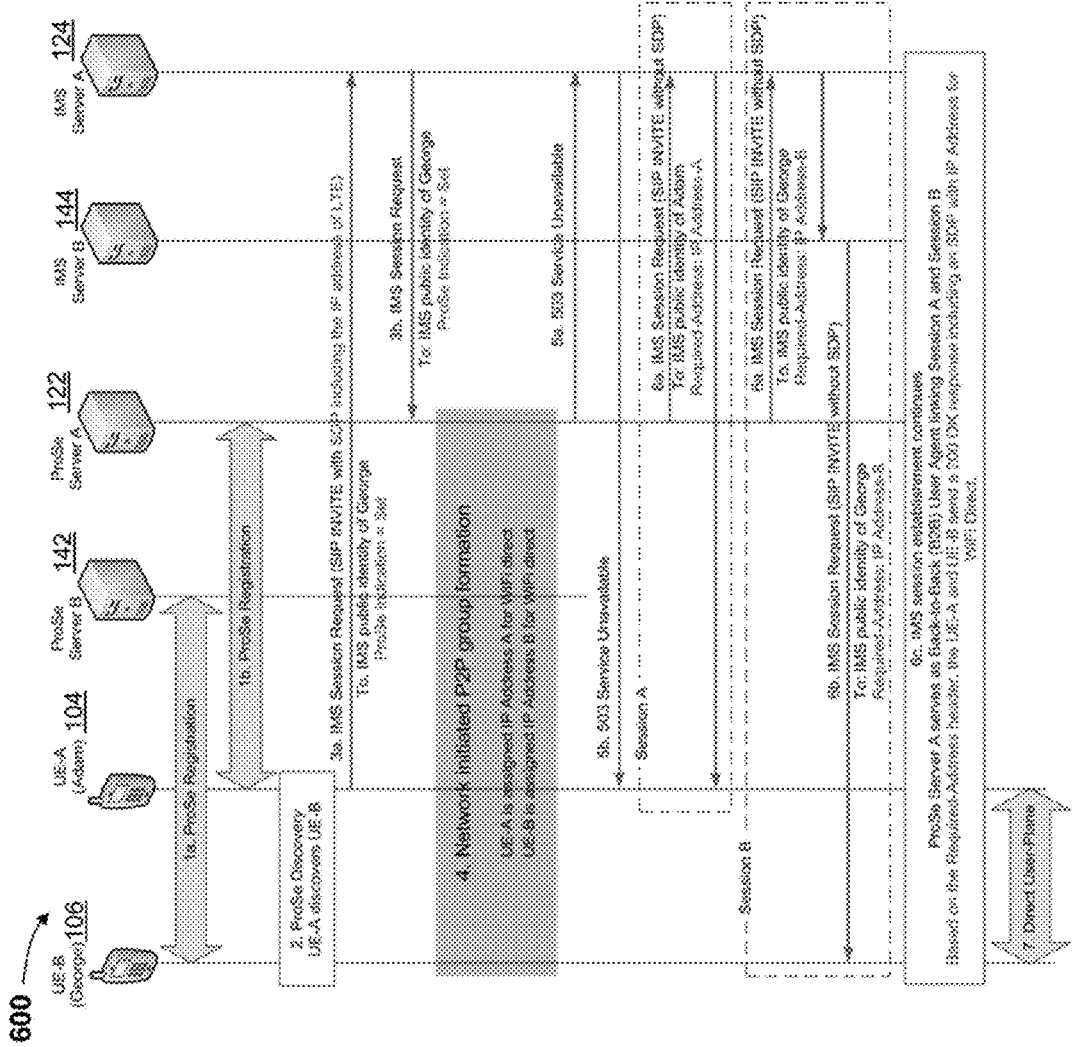
FIG. 6 illustrates a fourth messaging sequence used to establish a P2P group and enable a P2P communication session, according to one embodiment.

FIG. 3 illustrates a first messaging sequence used to establish a P2P group and enable a P2P communication session, according to one embodiment. In first message sequence 300, each message is numbered, and the messages range from message 1 to message 6e. Also, the functional processes at the different devices are illustrated as numbered blocks (e.g., 305). First UE is identified as belonging to user Adam, while second UE is identified as belonging to user George. As shown at block 305, first (ProSe) server (A) 122 associated with first controlling network 110 decides to form a P2P group between first UE 104 and second UE 106. First ProSe server 122 transmits a request (i.e., message 1) for establishing the P2P group to first UE 104 which is communicatively coupled to first controlling network 110. In one embodiment, first server 122 decides to initiate a P2P group formation between first UE ("Adam") 104 and second UE ("George") 106 independent of (i.e., without requiring) an initial communication request from first UE 104 to initiate or establish a P2P group or P2P communication session. In this case, first server 122 can request that first UE send a subsequent communication request in a specific format (e.g., using an SIP request). In one or more alternate embodiments (as shown in FIGS. 4-6, described hereafter), first server 122 is triggered to initiate a P2P group formation between first UE 104 and second UE ("George") 106 following receipt of a communication request sent by first UE 104 requesting a communication session with second UE 106. From a communication request received from first UE 104 or by another proximity determination made at first server 122, server 122 receives an indication or determines that first UE 104 and second UE 106 are in close proximity (of each other), such that direct communication can be established between first UE 104 and second UE 106.

As previously described, first server 122 initiates the P2P group formation by sending a ProSe group setup request message (i.e., message 1) to first UE 104. The group setup request message includes a number of P2P group operating parameters 210 including a Mode information element that indicates the specific close range communication technology (e.g., WiFi Direct or LTE Direct) to use for setting up the P2P group. In addition to selecting a specific close range communication technology (e.g., WiFi Direct) for the P2P group, first server 122 also provides, within the operating parameters, the following information elements:

(a) an SSID to use for WiFi Direct operation, where the SSID is compliant with the WiFi P2P specification and is in the form "DIRECT-xy", where xy are two random characters;

(b) a WiFi Secret Key to be used by both first UE 104 and second UE 106 (as the Pairwise Master Key (PMK)) to secure the WiFi direct communication;

(c) Implement Group Owner, which if set, serves to instruct first UE 104 to implement a Group Owner (GO) functionality specified in the WiFi P2P specification. By implementing the GO functionality, first UE 104 essentially becomes an access point (AP) that transmits Beacons with the P2P IP and accepts associations from other P2P devices or legacy WiFi devices (i.e., UEs that do not implement P2P functionality). If the "Implement Group Owner" parameter value is not set, the parameter value serves to instruct a UE receiving this parameter configuration to operate as a P2P client that attempts to discover and associate with a GO; and (d) Accept P2P Device ID parameter value, which is only required when the Implement Group Owner is set and indicates from which P2P device the GO (e.g., first UE 104) should accept WiFi association requests. Association requests from P2P devices that do not provide the Accept P2P Device ID parameter value are rejected by the GO.

In response to the group setup request (message 1), first UE 104 responds with a ProSe Group Setup Response message (i.e., message 2) which includes (a) the WiFi channel on which first UE 104 starts operating as the GO and (b) the respective P2P IP addresses (i.e., IP address A and IP address B) assigned to first UE 104 and second UE 106. In one embodiment, these P2P IP addresses are allocated by first UE 104 in order to expedite the P2P group formation by eliminating the need to subsequently use the Dynamic Host Configuration Protocol (DHCP) by which IP addresses can be automatically provided. The Dynamic Host Configuration Protocol (DHCP) is a network protocol used to configure devices that are connected to a network (e.g., a P2P group or network) so the devices can communicate on that network using the Internet Protocol (IP). The WiFi P2P specification assumes that a GO functions as a DHCP server and dynamically allocates IP addresses to P2P clients. However, this DHCP functionality is not required in the disclosed P2P group formation procedure.

By having first UE 104 send the assigned P2P IP addresses to first server 122, first server 122 is able to subsequently invite first UE 104 and second UE 106 to establish a direct communication session by using these assigned P2P IP addresses.

At block 310, first UE 104 activates the WiFi by tuning to the indicated WiFi channel (e.g., channel 11) and beginning to function as the GO, in which role first UE 104 essentially becomes an AP. In one embodiment, first UE 104 tunes to the indicated WiFi channel and/or begins operating as the GO by transmitting and/or receiving one or more signals or messages (e.g., messages 3). As the GO, first UE 104 accept associations only from a WiFi client that includes in the Association Request a P2P Device ID=Accept P2P Device ID, in order to ensure that only the UEs that first server 122 has previously identified for inclusion within the P2P group can be part of the established P2P group.

Following, or concurrently with WiFi activation by first UE 104, first server 122 sends a ProSe Group Setup Request (i.e., message 4) to second UE 106 via second ProSe server 142. This request needs to be routed via another ProSe server if second UE 106 is unknown to first server 122. For example, when second UE 106 has a proximity services subscription in another mobile network, such as second controlling network 130, the request is routed through second server 142. In one implementation, first server 122 is able to find the contact information of second server 142 (i.e., ProSe Server B) by performing a Domain Name System (DNS) query or by querying the Home Subscriber Server (HSS) of second UE 106. It is assumed that, with the described embodiments, first server 122 knows the ProSe identity of first UE 104 (e.g. prose1234@operator1.com) and second UE 106 (e.g. prose5678@operator2.com).

The ProSe Group Setup Request (message 4) sent to second UE 106 includes the P2P operating parameters including the same Mode information sent previously to first UE 104. When Mode=WiFi Direct, the following information elements are also included:
  a. The SSID: The same SSID sent to first UE 104.
  b. The WiFi Secret Key: The same pre-shared key sent to first UE 104.
  c. The WiFi Channel: The WiFi channel indicated by first UE 104 (via message 2).
  d. IP Address B: a second assigned P2P IP address previously allocated by first UE 104.
  e. Implement Group Owner: In this case, this parameter value is unset so that second UE 106 behaves as a P2P client that attempts to discover and associate with a GO (e.g., first UE 104).
  f. P2P Device ID: The same as the Accept P2P Device ID previously sent to first UE 104 (via message 2).

Second UE 106 accepts the request and responds with a ProSe Group Setup Response (i.e., message 5) which is forwarded to first ProSe Server (A) 122. Second UE 106 starts functioning as P2P client and searches for a GO supporting the received SSID. Thus, second UE 106 sends a Probe Request (as per the WiFi P2P specs) illustrated as message/signal 6a which includes the SSID and the P2P Device ID received from the network (via message 4). First UE 104 responds via message/signal 6b to the Probe Request since the probe request contains a P2P Device ID that matches the Accept P2P Device ID received from first server 122.

Following the response by first UE 104 to the probe request, (a) an authentication procedure (i.e., via message 6c) such as IEEE 802.11 authentication and (b) an association procedure (i.e., via message 6d) are performed between the two devices. The authentication and association procedures are followed by a handshake procedure (i.e., via message 6e), such as 802.1x 4-way handshake. The association request (i.e., message 6d) sent by first UE 104 includes the P2P Device ID (provided by message 1 and) received by first server 122 and first controlling network 110. During the 4-way handshake procedure, first UE 104 and second UE 106 use the shared WiFi secret key to derive keying material for protecting unicast and broadcast traffic (as per IEEE 802.11e specifications). At block 315, first UE 104 assigns the first IP address to the established WiFi interface, and at block 320, second UE 106 assigns the second IP address to the established WiFi interface at the second UE 106.

FIG. 4 illustrates a second messaging sequence used to establish a P2P group and enable a P2P communication session, according to one embodiment. Message sequence 400 illustrates a device initiated request for establishing a P2P group. Message(s) 1a are communicated between second UE ("George") 106 and second ProSe server (B) 142 to enable second UE 106 to be registered for proximity services through second ProSe server 142. Similarly, message(s) 1b are communicated between first UE ("Adam") 104 and first server (A) 122 to enable first UE 104 to be registered for proximity services through first server (A) 122. Message(s)/signals 2 are exchanged between first UE 104 and second UE 106 to enable first UE 104 and second UE 106 to discover each other. First UE 104 sends message(s) 3a to first IMS server (A) 124. In particular, first UE 104 sends an IMS session request which is transmitted as an SIP Invite which includes a Session Description Protocol (SDP) offer that contains the current IP address over LTE for first UE 104. In one implementation, the SDP offer contains the current IP address over LTE in the "c=" (data field) line. The SIP Invite also includes a "ProSe Indication" which indicates that second UE 106 (i.e., the target user (George)) is in close proximity with first UE 104 (i.e., the requesting user (Adam)) and that the session could use a direct user-plane between UE-A and UE-B. Based on the ProSe Indication, first IMS Server 124 (e.g., providing a Serving Call Session Control Function (S-CSCF)) forwards the SIP Invite (i.e., message 3b) to first ProSe Server 122, which, in this case, is an IMS Application Server.

First ProSe Server 122 decides that, since first UE 104 and second UE 106 are in close proximity of each other, the requested session should be established with a direct user-plane between first UE 104 and second UE 106. Thus, first ProSe Server 122 triggers the Network-Initiated P2P Group Formation procedure (described using FIG. 3), and which includes sending message(s) 4 in order for first UE 104 and second UE 106 to form a P2P group and enable first UE 104 and second UE 106 for direct communication. During the Network-Initiated P2P Group Formation procedure, first UE 104 and second UE 106 activate respective WiFi interfaces in WiFi Direct mode (i.e., a selected close range communication technology) and are assigned IP addresses.

However, first ProSe Server 122 establishes the P2P group without initially enabling the direct user-plane which provides a direct communication session between first UE 104 and second UE 106. When the P2P group is successfully set up, first ProSe Server 122 becomes aware of the new IP addresses assigned to first UE 104 and second UE 106 for WiFi Direct. In one embodiment, first server 122 assigns P2P IP addresses for WiFi Direct to both first UE 104 and second UE 106. In another embodiment, first UE 104 assigns the P2P IP address for WiFi Direct. First ProSe Server 122 responds to the IMS session request sent by first UE 104 by requesting that first UE 104 send another IMS session request using alternative contact information (i.e., the assigned P2P IP addresses) to allow the communication session to be enabled. For example, first server 122 responds with a message (e.g., in one implementation, a "503 Server Unavailable" message as messages 5a and 5b) to indicate that the communication session was not established and to instruct first UE 104 to send another IMS session request using the assigned P2P IP addresses. In one embodiment, first UE 104 sends a second IMS session request by using a new SIP header, such as a "Retry-with-Alternative-Contact" header, that includes the IP addresses assigned to first UE 104 and second UE 106 for WiFi direct.

First UE 104 sends to second UE 106 via first server 122 an SIP Invite (via message 6a) which now contains in SDP the P2P IP address (in "c=" line) assigned to first UE 104. First UE 104 will use this address for media communication over WiFi direct. In order to require that second UE 106 use a corresponding WiFi direct interface for media communication, first UE 104 includes a new Required-Address header that contains the P2P IP address assigned to second UE 106. First server 122 forwards to second UE 106 the SIP Invite that includes the new Required-Address header with the P2P IP address assigned to second UE 106. Based on receipt of the P2P IP address provided via the new Required-Address header to second UE 106, second UE 106 accepts the SIP Invite by sending an "OK" response (via message 6b) that contains an SDP which includes the P2P IP address assigned to second UE 106. As illustrated by message(s) 7, based on the assigned P2P IP addresses, first UE 104 and second UE 106 establish a user-plane that provides a direct communication session over WiFi Direct.

FIG. 5 illustrates a third messaging sequence used to establish a P2P group and enable a P2P communication session, according to one embodiment. Message sequence 500 illustrates a device initiated request for establishing a P2P group. Message(s) 1a are communicated between second UE ("George") 106 and second server (B) 142 to enable second UE 106 to be registered for proximity services through second server 142. Similarly, message(s) 1b are communicated between first UE ("Adam") 104 and first server (A) 122 to enable first UE ("Adam") 104 to be registered for proximity services through first server 122. Message(s)/signals 2 are exchanged between first UE 104 and second UE 106 to enable first UE 104 and second UE 106 to discover each other. First UE 104 sends message(s) 3 to first server (A) 122. In particular, first UE 104 sends a service request that contains the current IP address over LTE for first UE 104. The service request includes a "ProSe Indication" which indicates that second UE 106 (i.e., the target user (George)) is in close proximity with first UE 104 (i.e., the requesting user (Adam)) and that the session could use a direct user-plane between UE-A and UE-B.

Based on the ProSe Indication, first ProSe Server 122 decides that, since first UE 104 and second UE 106 are in close proximity of each other, the requested session should be established with a direct user-plane between first UE 104 and second UE 106. Thus, first ProSe Server 122 triggers the Network-Initiated P2P Group Formation procedure (described using FIG. 3), and which includes sending message(s) 4, in order for first UE 104 and second UE 106 to form a P2P group and enable first UE 104 and second UE 106 for direct communication. During the Network-Initiated P2P Group Formation procedure, first UE 104 and second UE 106 activate respective WiFi interfaces in WiFi Direct mode (i.e., a selected close range communication technology) and are assigned IP addresses.

However, first ProSe Server 122 establishes the P2P group without initially enabling the direct user-plane which provides a direct communication session between first UE 104 and second UE 106. When the P2P group is successfully setup, first ProSe Server 122 becomes aware of the new IP addresses assigned to first UE 104 and second UE 106 for WiFi Direct. In one embodiment, first server 122 assigns P2P IP addresses for WiFi Direct to both first UE 104 and second UE 106. In another embodiment, first UE 104 assigns the P2P IP address for WiFi Direct.

First ProSe Server 122 responds (via message 5) to the service request sent by first UE 104 by notifying first UE 104 that the P2P group has been established and requesting that first UE 104 transmits a communication session request to second UE 106 to instruct second UE 106 to use an assigned second P2P IP address for P2P communication.

First UE 104 sends to second UE 106 via first server 122 an SIP Invite (via message 6a) which now contains in SDP the P2P IP address assigned to first UE 104. First UE 104 will use this address for media communication over WiFi direct. In order to require that second UE 106 use a corresponding WiFi direct interface for media communication, first UE 104 includes a new Required-Address header that contains the P2P IP address assigned to second UE 106. Based on receipt of the P2P IP address provided via the new Required-Address header to second UE 106, second UE 106 accepts the SIP Invite by sending an "OK" response (via message 6b) that contains an SDP which includes the P2P IP address assigned to second UE 106. As illustrated by message(s) 7, based on the assigned P2P IP addresses, first UE 104 and second UE 106 establish a user-plane that provides a direct communication session over WiFi Direct.

FIG. 6 illustrates a fourth messaging sequence used to establish a P2P group and enable a P2P communication session, according to one embodiment. Message sequence 600 illustrates a device initiated request for establishing a P2P group. Message(s) 1a are communicated between second UE ("George") 106 and second server (B) 142 to enable second UE 106 to be registered for proximity services through second server 142. Similarly, message(s) 1b are communicated between first UE ("Adam") 104 and first server (A) 122 to enable first UE 104 to be registered for proximity services through first server 122. Message(s)/signals 2 are exchanged between first UE 104 and second UE 106 to enable first UE 104 and second UE 106 to discover each other. First UE 104 sends message(s) 3a to first IMS server (A) 124. In particular, first UE 104 sends an IMS session request which is transmitted as an SIP Invite which includes a Session Description Protocol (SDP) offer that contains the current IP address over LTE for first UE 104. In one implementation, the SDP offer contains the current IP address over LTE in the "c=" (data field) line. The SIP Invite also includes a "ProSe Indication" which indicates that second UE 106 (i.e., the target user (George)) is in close proximity with first UE 104 (i.e., the requesting user (Adam)) and that the session could use a direct user-plane between UE-A and UE-B. Based on the ProSe Indication, first IMS Server 124 (e.g., providing a Serving Call Session Control Function (S-CSCF)) forwards the SIP Invite (i.e., message 3b) to first ProSe Server 122, which, in this case, is an IMS Application Server.

First ProSe Server 122 decides that, since first UE 104 and second UE 106 are in close proximity of each other, the requested session should be established with a direct user-plane between first UE 104 and second UE 106. Thus, first ProSe Server 122 triggers the Network-Initiated P2P Group Formation procedure (described using FIG. 3), and which includes sending message(s) 4 in order for first UE 104 and second UE 106 to form a P2P group and enable first UE 104 and second UE 106 for direct communication. During the Network-Initiated P2P Group Formation procedure, first UE 104 and second UE 106 activate respective WiFi interfaces in WiFi Direct mode (i.e., a selected close range communication technology) and are assigned IP addresses.

However, first ProSe Server 122 establishes the P2P group without initially enabling the direct user-plane which provides a direct communication session between first UE 104 and second UE 106. When the P2P group is successfully setup, first ProSe Server 122 becomes aware of the new IP addresses assigned to first UE 104 and second UE 106 for WiFi Direct. In one embodiment, first ProSe Server 122 assigns P2P IP addresses for WiFi Direct to both first UE 104 and second UE 106. In another embodiment, first UE 104 assigns the P2P IP address for WiFi Direct.

Following establishment of the P2P group and in response to receipt of the IMS session request message previously sent by first UE 104, first ProSe Server 122 sends to first UE 104 a response (via messages 5a and 5b) which notifies first UE 104 that the P2P group was established but the communication session was not enabled. In one implementation, messages 5a and 5b are "503 Server Unavailable" messages. First server 122 sends a first individual communication session request (via message 6a) instructing first UE 104 to use a first assigned IP address for communicating within the P2P group. In addition, first server 122 sends a second communication session request (via message 6b) to second UE 106 instructing second UE 106 to use a second assigned IP address for communicating within the P2P group.

In order to require that first UE 104 and second UE 106 use respective WiFi direct interfaces for media communication, first ProSe Server 122 respectively includes within messages 6a and 6b a new Required-Address header that contains the P2P IP addresses assigned to first UE 104 and second UE 106.

Based on receipt of the P2P IP addresses provided via the new Required-Address header to first UE 104 and second UE 106, first UE 104 and second UE 106 respectively send "OK" responses (via messages 6c) which contain SDP which includes the P2P IP addresses assigned to first UE 104 and second UE 106. In response to receipt of the "OK" responses, first server 122 respectively enables individual communication sessions for first UE 104 and second UE 106. As illustrated by message(s) 7, based on the assigned P2P IP addresses, first UE 104 and second UE 106 establish a user-plane that provides a direct communication session over WiFi Direct. In particular, in one embodiment, first ProSe Server 122 provides the communication session between first UE 104 and second UE 106 by linking the individual communication sessions.

Figure 7:
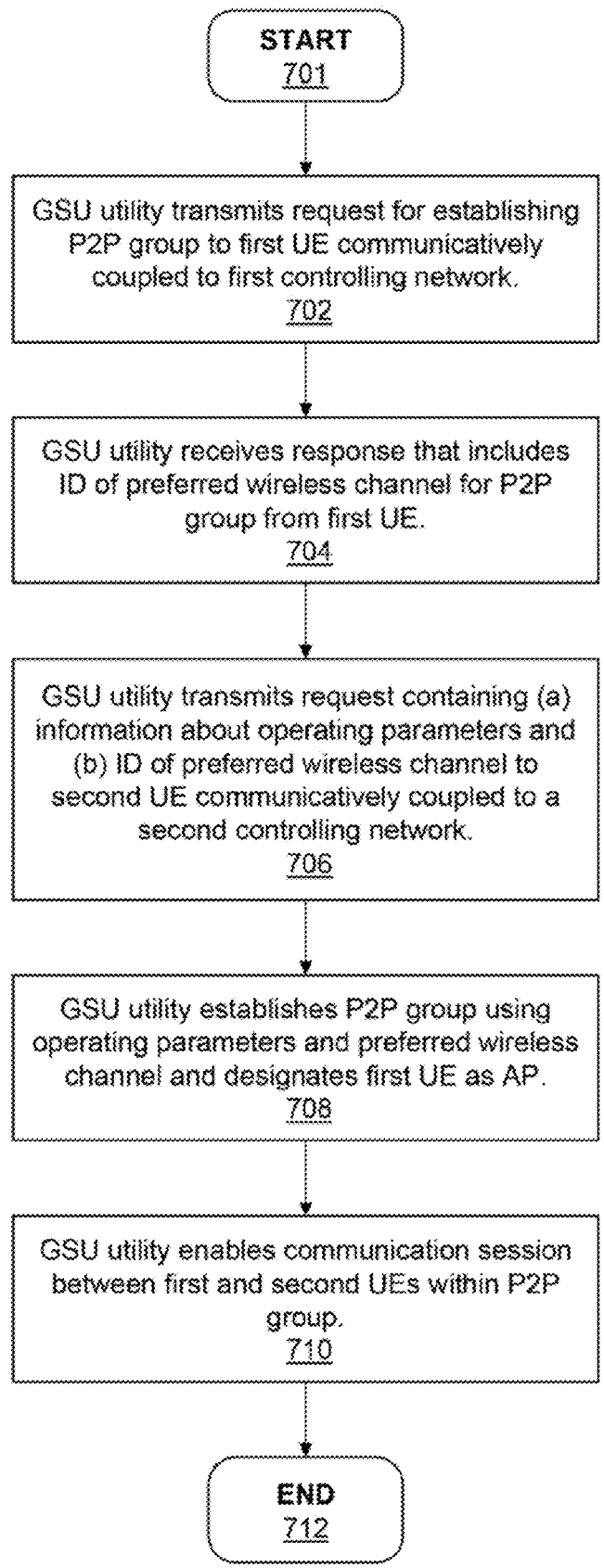
FIG. 7 is a flow chart illustrating one method for establishing a P2P group and enabling a P2P communication session, according to one embodiment.
Figure 8:
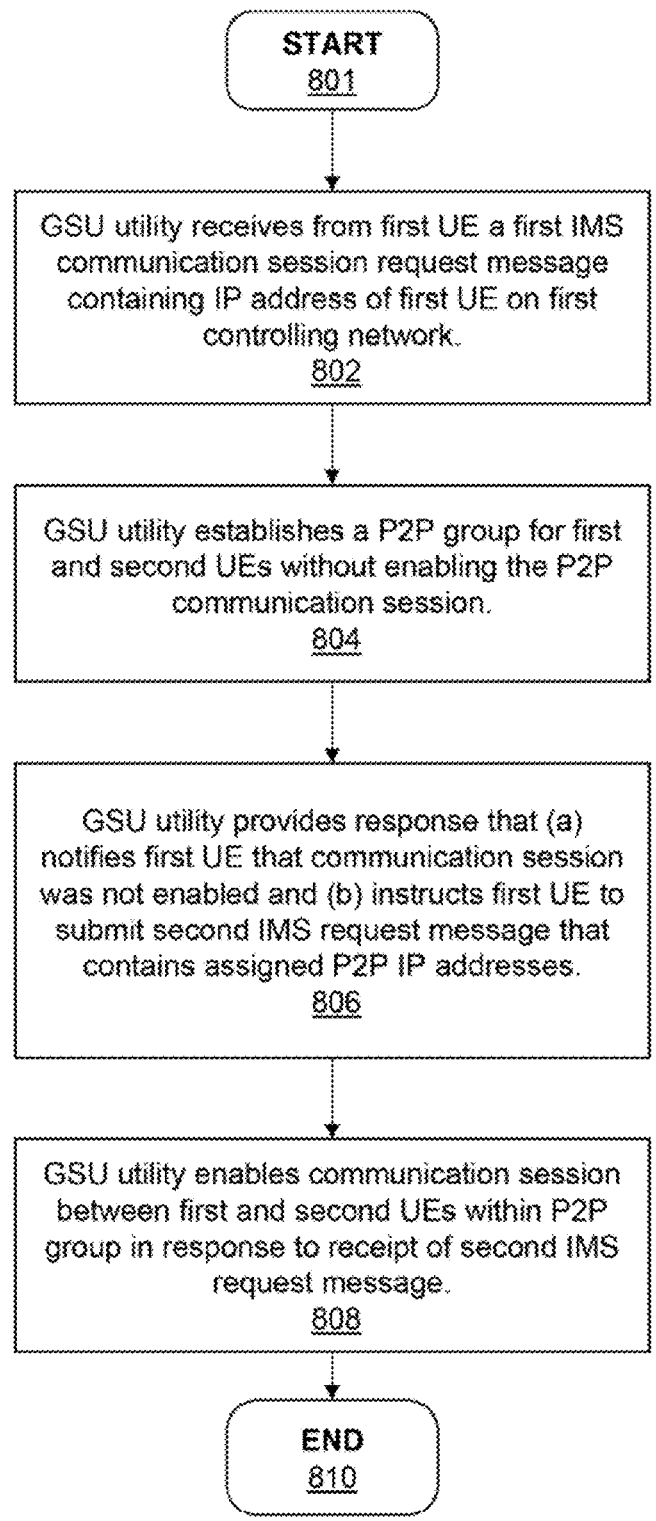
FIG. 8 is a flow chart illustrating a second method for establishing a P2P group and enabling a P2P communication session, according to one embodiment.
Figure 9:
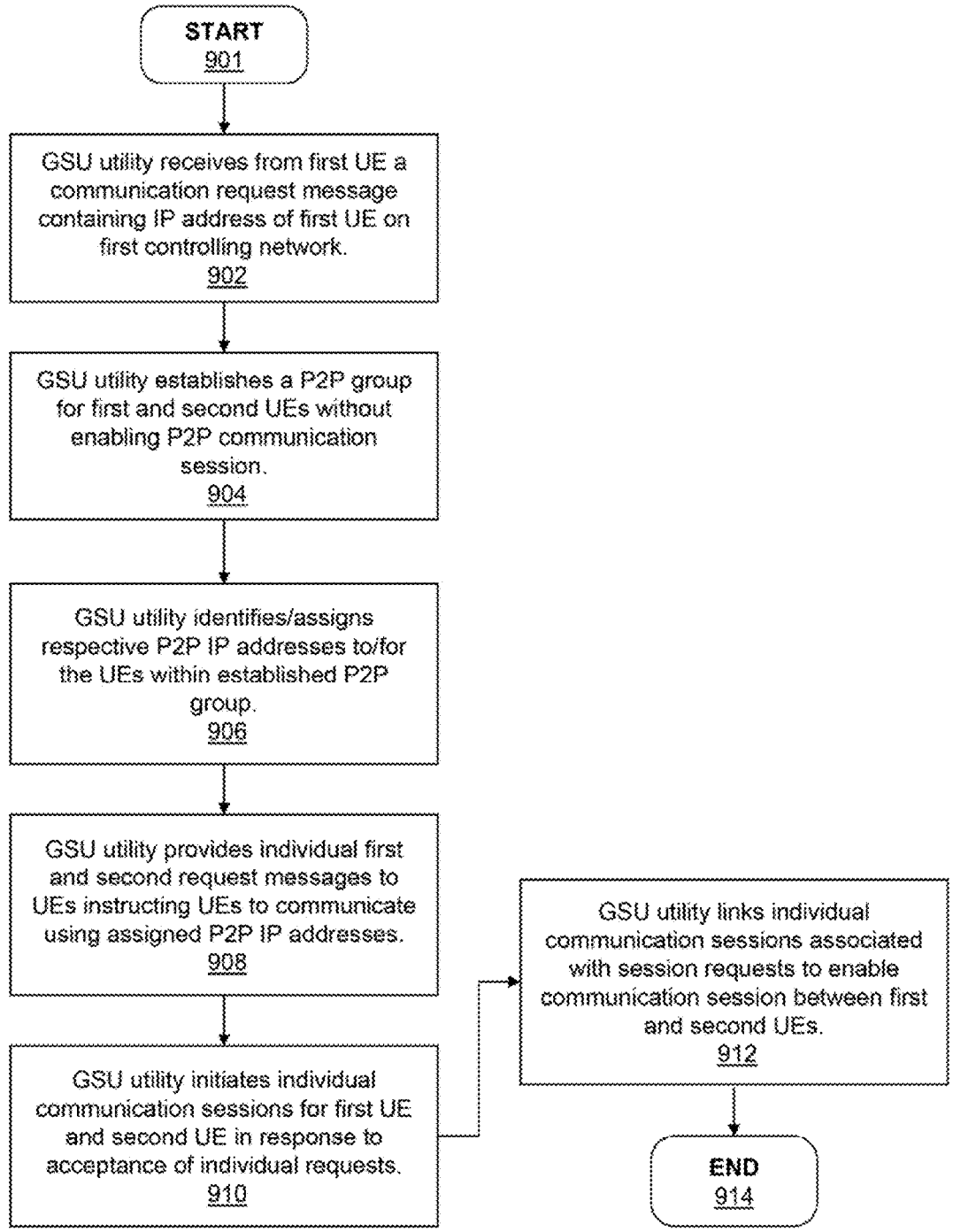
FIG. 9 is a flow chart illustrating a third method for establishing a P2P group and enabling a P2P communication session, according to one embodiment.
Figure 10:
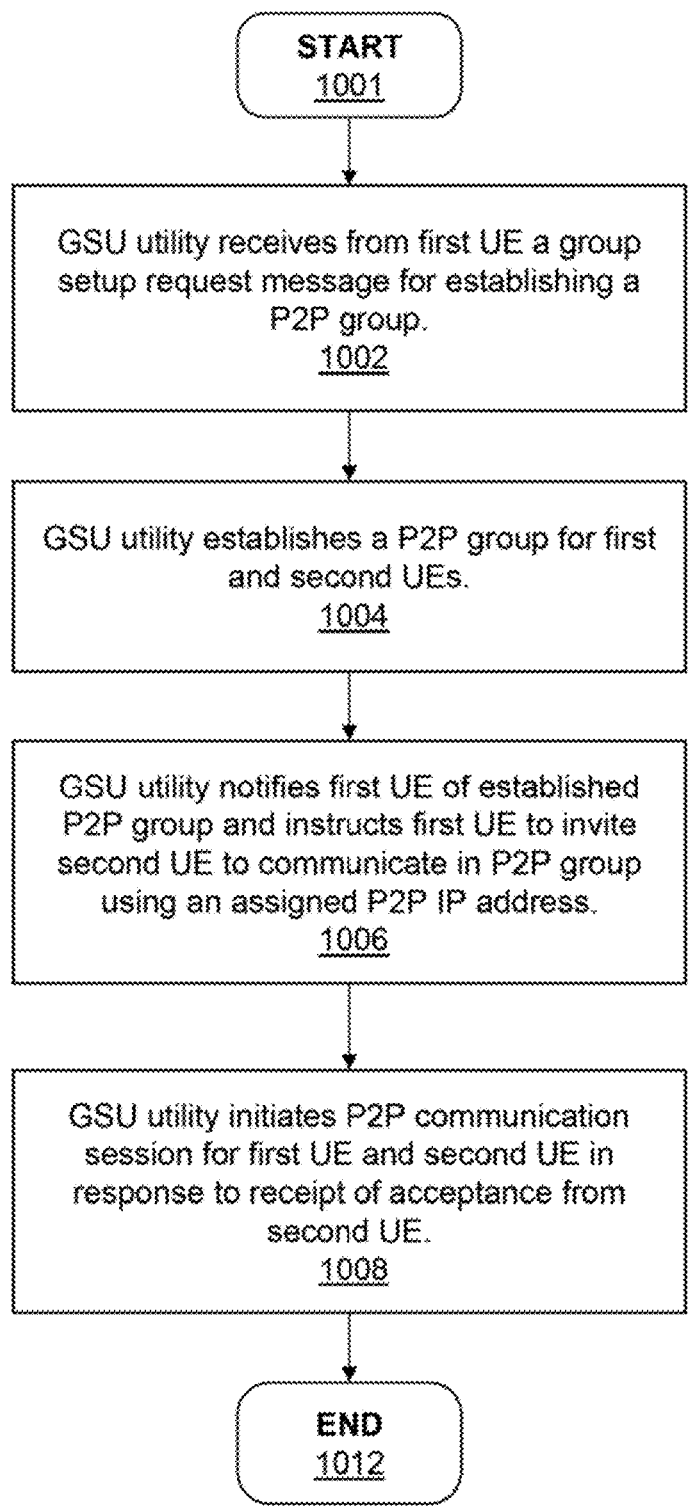
FIG. 10 is a flow chart illustrating a fourth method for establishing a P2P group and enabling a P2P communication session, according to one embodiment.

FIGS. 7-10 are flow charts illustrating embodiments of the method by which the above processes of the illustrative embodiments can be implemented. Specifically, FIG. 7 illustrates a first method for establishing a P2P group and enabling a P2P communication session between wireless communication devices within the P2P group. FIG. 8 illustrates a second method for establishing a P2P group and enabling a P2P communication session. FIG. 9 illustrates a third method for establishing a P2P group and enabling a P2P communication session. FIG. 10 illustrates a fourth method for establishing a P2P group and enabling a P2P communication session. Although the method illustrated by FIGS. 7-10 may be described with reference to components and functionality illustrated by and described in reference to FIGS. 1-6, it should be understood that this is merely for convenience and alternative components and/or configurations thereof can be employed when implementing the method. Certain portions of the methods may be completed by GSU utility 216 executing on one or more processors (processor 202) within first ProSe Server 122 (FIGS. 1 and 2). The executed processes then control specific operations of or on first ProSe Server 122 and first controlling network 110. For simplicity is describing the method, all method processes are described from the perspective of first server 110 and P2P group setup utility 216.

The method of FIG. 7 begins at initiator block 701 and proceeds to block 702 at which GSU utility 216 transmits a first request for establishing a P2P group to first UE 104 which is communicatively coupled to first controlling network 110. At block 704, GSU utility 216 receives from first UE 104 a response that contains operating parameters for the P2P group including an identifier (ID) of a preferred wireless operating channel and P2P IP addresses respectively allocated to first UE 104 and second UE 106 for use within the P2P group. At block 706, GSU utility 216 transmits to second UE 106 coupled to second controlling network 130 a request containing (a) information about operating parameters and (b) the ID of the preferred wireless channel. At block 708, GSU utility 216 establishes the P2P group using the P2P operating parameters including the preferred wireless channel and designates first UE 104 as the GO operating as the access point for the P2P group. At block 710, GSU utility 216 enables a direct communication session between first UE 104 and second UE 106 within P2P group 102. The process ends at block 712.

The method of FIG. 8 begins at initiator block 801 and proceeds to block 802 at which GSU utility 216 receives from first UE 104 a first IMS request message containing an IP address of first UE 104 on first controlling network 110. At block 804, GSU utility 216 establishes a P2P group for first UE 104 and second UE 106 without enabling a P2P communication session. At block 806, GSU utility 216 provides a response that (a) notifies first UE 104 that a P2P communication session was not enabled and (b) instructs first UE 104 to submit second IMS request message that contains the assigned P2P IP addresses. At block 808, GSU utility 216 enables a P2P communication session between first UE 104 and second UE 106 within P2P group in response to receipt of the second IMS request message. The process ends at block 810.

The method of FIG. 9 begins at initiator block 901 and proceeds to block 902 at which GSU utility 216 receives from first UE 104 a first IMS request message containing an IP address of first UE 104 on first controlling network 110. In addition, the first IMS request message indicates that at least one other UE including second UE 106 is in close proximity with first UE 104. At block 904, based on the close proximity between the UEs, GSU utility 216 establishes a P2P group for first UE 104 and second UE 106 without enabling a P2P communication session. At block 906, GSU utility 216 identifies or assigns respective P2P Internet Protocol (IP) addresses to/for the UEs within the established P2P group. At block 908, GSU utility 216 provides individual first and second request messages to first UE 104 and second UE 106 instructing these devices to communicate using P2P IP addresses assigned to first UE 104 and second UE 106. At block 910, in response first server 122 receiving respective messages indicating that first UE 104 and second UE 106 accept the individual first and second request messages, GSU utility 216 initiates individual communication sessions for first UE 104 and second UE 106. At block 912, GSU utility 216 links the individual communication sessions associated with individual first and second requests to enable a P2P communication session between first UE 104 and second UE 106. The process ends at block 914.

The method of FIG. 10 begins at initiator block 1001 and proceeds to block 1002 at which GSU utility 216 receives from first UE 104 a first communication request message requesting establishment of a P2P group for first UE 104 and second UE 106. At block 1004, GSU utility 216 establishes a P2P group for first UE 104 and second UE 106. At block 1006, GSU utility 216 sends a first response message to first UE 104 notifying first UE 104 that the P2P group has been established and of a P2P address assigned to first UE 104 that is to be used for P2P communication. In addition, the response message instructs first UE 104 to send an IMS request message to second UE 106 instructing second UE 106 to use an IP address assigned to second UE 106 for communication within the established P2P group. At block 1008, in response to first server 122 receiving a second response message indicating that second UE 106 accept the IMS request message, GSU utility 216 enables a P2P communication session between first UE 104 and second UE 106. The process ends at block 1010.

The flowcharts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for establishing a peer to peer (P2P) communication session between a first wireless communication device and at least one other wireless communication device, the method comprising:

receiving from the first wireless communication device a communication request message indicating that at least one other wireless communication device is in close proximity with the first wireless communication device;

establishing a P2P group which includes the first wireless communication device and at least one other wireless communication device, based on the close proximity between the wireless communication devices;

identifying respective P2P IP addresses for the first wireless communication device and the at least one other wireless communication device within the established P2P group;

instructing the first wireless communication device and the at least one other wireless communication device to communicate within the established P2P group using respective P2P IP addresses; and following receipt of a response indicating acceptance by a second wireless communication device of an instruction to communicate within the established P2P group using a corresponding P2P IP address, establishing the communication session, wherein said establishing the P2P group further comprises:

transmitting from a controlling network to the first wireless communication device a first request for establishing the P2P group, wherein said first request contains information about operating parameters for the P2P group;

receiving a response from the first wireless communication device that includes an identifier (ID) of a preferred wireless channel for the P2P group;

transmitting to a second wireless communication device a second request containing (a) the information about the operating parameters and (b) the ID of the preferred wireless channel;

designating a selected wireless communication device from the established P2P group as an access point for the P2P group; and wherein the P2P group is established using the operating parameters and the preferred wireless channel, the method further comprising: retrieving from the communication request message an IP address of the first wireless communication device associated with the controlling network wherein transmitting the first request for establishing the P2P group is triggered in response to receipt of the communication request message;

checking the communication request message for inclusion of a pair of P2P IP addresses to assign to participants associated with the received communication request; and in response to the received communication request message not including the pair of P2P IP addresses, setting up the P2P group without enabling a P2P communication session.

2. The method of claim 1, wherein the communication request message is a first-type communication request message for enabling the P2P communication session and the method further comprises:

in response to receipt of the first-type request message:
sending, to the first wireless communication device, a first individual communication session request including a first assigned IP address and instructing the first wireless communication device to use the first assigned IP address for communicating within the P2P group; and sending, to the second wireless communication device, a second communication session request including a second assigned IP address and instructing the second wireless communication device to use the second assigned IP address for communicating within the P2P group; and following transmission of the individual communication requests: respectively enabling individual communication sessions for the first and second wireless communication devices; and providing the communication session between the first and second wireless communication devices by linking the individual communication sessions.

3. The method of claim 1, wherein the operating parameters include at least one of: (a) a close range communication technology to be used for the P2P group; (b) a P2P group identity; (c) P2P group security information; and (d) P2P IP address information for wireless communication devices that are included within the P2P group.

4. The method of claim 1, wherein the first wireless communication device is communicatively coupled to a first controlling network and the second wireless communication device is communicatively coupled to a second controlling network that is different from the first controlling network, and the method further comprises:

triggering an establishment of the P2P group and initiating the communication session by routing messages that are communicated between a first server in the first controlling network and the second wireless communication device via a second server in the second controlling network at which the second device is registered, wherein the second wireless communication device is triggered to initiate operation as a P2P client and search for a wireless communication device operating as the access point that supports the operating parameters, in order to enable a P2P communication session.

5. The method of claim 1, wherein the communication request message is a first-type request message for enabling the P2P communication session and the method further comprises:

in response to receipt of the first-type request message, providing a response message that (a) notifies the first wireless communication device that the P2P communication session was not enabled and (b) instructs the first wireless communication device to submit a second communication request message that contains respectively assigned IP addresses associated with the established P2P group; and in response to subsequently receiving the second communication request message, enabling said P2P communication session using the respectively assigned IP addresses.

6. The method of claim 1, wherein the communication request message is a second-type request message requesting the P2P group be established, and the method further comprises:

in response to receipt of the second-type request message:
notifying said first wireless communication device that the P2P group has been established; and instructing the first wireless communication device to use an assigned first P2P IP address for P2P communication;

in response to the P2P group being established, triggering the first wireless communication device to transmit a communication session request to the second wireless communication device that instructs the second wireless communication device to use an assigned second P2P IP address for P2P communication; and enabling the communication session for the P2P group using the assigned first P2P IP address for the first wireless communication device and the assigned second P2P IP address for the second wireless communication device.

7. The method of claim 1, wherein the communication request message received from the first wireless communication device is an Internet Protocol Multimedia Subsystem (IMS) session request message transmitted as a Session Initiation Protocol (SIP) invite.

8. The method of claim 1, wherein:
the first communication device sends the communication session request message in response to discovering the second communication device via one of: (a) WiFi Direct, (b) Long Term Evolution (LTE) Direct, (c) Bluetooth and (d) another close range communication technology.

9. A data processing system (DPS) communicatively coupled to a first wireless communication device and operating as a first proximity services server within a controlling network and which includes:

at least one processor;
at least one memory system; and
a group set-up utility which when executed on the at least one processor:
receives from the first wireless communication device a communication request message indicating that at least one other wireless communication device is in close proximity with the first wireless communication device;
establishes a P2P group which includes the first wireless communication device and at least one other wireless communication device, based on the close proximity between the wireless communication devices;

identifies respective P2P IP addresses for the first wireless communication device and the at least one other wireless communication device within the established P2P group;
instructs the first wireless communication device and the at least one other wireless communication device to communicate within the established P2P group using respective P2P IP addresses; and
following receipt of a response indicating acceptance by a second wireless communication device of an instruction to communicate within the established P2P group using a corresponding P2P IP address, establishes the communication session,
wherein the DPS establishes the P2P group by:
transmitting from a controlling network to the first wireless communication device a first request for establishing the P2P group, wherein said first request contains information about operating parameters for the P2P group;
receiving a response from the first wireless communication device that includes an identifier (ID) of a preferred wireless channel for the P2P group;
transmitting to a second wireless communication device a second request containing (a) the information about the operating parameters and (b) the ID of the preferred wireless channel;
designating a selected wireless communication device from the established P2P group as an access point for the P2P group; and
wherein the P2P group is established using the operating parameters and the preferred wireless channel,
wherein the DPS:
retrieves from the communication request message an IP address of the first wireless communication device associated with the controlling network, wherein transmitting the first request for establishing the P2P group is triggered in response to receipt of the communication request message;
checks the communication request message for inclusion of a pair of P2P IP addresses to assign to participants associated with the received communication request; and
in response to the received communication request message not including the pair of P2P IP addresses, setting up the P2P group without enabling a P2P communication session.

10. The DPS of claim 9, wherein the communication request message is a first-type communication request message for enabling the P2P communication session and wherein the DPS:
in response to receipt of the first-type request message: sends, to the first wireless communication device, a first individual communication session request including a first assigned IP address and instructing the first wireless communication device to use the first assigned IP address for communicating within the P2P group; and
sends, to the second wireless communication device, a second communication session request including a second assigned IP address and instructing the second wireless communication device to use the second assigned IP address for communicating within the P2P group; and
following transmission of the individual communication requests: respectively enables individual communication sessions for the first and second wireless communication devices; and provides the communication session between the first and second wireless communication devices by linking the individual communication sessions.

11. The DPS of claim 9, wherein the operating parameters include at least one of: (a) a close range communication technology to be used for the P2P group; (b) a P2P group identity; (c) P2P group security information; and (d) P2P IP address information for wireless communication devices that are included within the P2P group.

12. The DPS of claim 9, wherein:
the first wireless communication device is communicatively coupled to a first controlling network, the second wireless communication device is communicatively coupled to a second controlling network that is different from the first controlling network; and
the DPS triggers an establishment of the P2P group and initiates the communication session by routing messages that are communicated between a first proximity services server in the first controlling network and the second wireless communication device via a second proximity services server in the second controlling network at which the second device is registered, wherein the second wireless communication device is triggered to initiate operation as a P2P client and search for a wireless communication device operating as the access point that supports the operating parameters, in order to enable a P2P communication session.

13. The DPS of claim 9, wherein the communication request message is a first-type request message for enabling the P2P communication session, and the DPS:
in response to receipt of the first-type request message, provides a response message that (a) notifies the first wireless communication device that the P2P communication session was not enabled and (b) instructs the first wireless communication device to submit a second communication request message that contains respectively assigned IP addresses associated with the established P2P group; and
in response to subsequently receiving the second communication request message, enables said P2P communication session using the respectively assigned IP addresses.

14. The DPS of claim 9, wherein the communication request message is a second-type request message requesting the P2P group be established, and the DPS:
in response to receipt of the second-type request message:
notifies said first wireless communication device that the P2P group has been established; and instructs the first wireless communication device to use an assigned first P2P IP address for P2P communication;
in response to the P2P group being established, triggers the first wireless communication device to transmit a communication session request to the second wireless communication device that instructs the second wireless communication device to use an assigned second P2P IP address for P2P communication; and
enables the communication session for the P2P group using the assigned first P2P IP address for the first wireless communication device and the assigned second P2P IP address for the second wireless communication device.

* * * * *